United States Patent
Suga et al.

(10) Patent No.: US 6,623,716 B2
(45) Date of Patent: Sep. 23, 2003

(54) EXHAUST GAS PURIFYING CATALYST

(75) Inventors: Katsuo Suga, Yokohama (JP); Masanori Nakamura, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 24 days.

(21) Appl. No.: 09/820,985

(22) Filed: Mar. 30, 2001

(65) Prior Publication Data

US 2001/0046455 A1 Nov. 29, 2001

(30) Foreign Application Priority Data

Apr. 25, 2000 (JP) ........................................ 2000-123905

(51) Int. Cl.$^7$ ............................................... B01D 53/56
(52) U.S. Cl. .................... 423/239.1; 502/302; 502/303; 502/304; 502/325; 502/326; 502/327; 502/333; 502/334; 502/339; 502/340
(58) Field of Search ...................... 423/239.1; 502/302, 502/303, 304, 325, 326, 327, 333, 334, 339, 340, 341

(56) References Cited

U.S. PATENT DOCUMENTS 3,972,979 A  8/1976  Kageyama ................ 423/240
5,762,892 A * 6/1998  Kasahara et al. ......... 423/213.5

FOREIGN PATENT DOCUMENTS

EP  0 856 350 A1  8/1998  ........... B01D/53/94
JP  5-168860  7/1993  ........... B01D/53/36

* cited by examiner

Primary Examiner—Stanley S. Silverman
Assistant Examiner—Maribel Medina
(74) Attorney, Agent, or Firm—Foley & Lardner

(57) ABSTRACT

An exhaust gas purifying catalyst for purifying exhaust gas discharged from an automotive internal combustion engine. The exhaust gas purifying catalyst comprises at least one noble metal selected from the group consisting of platinum, palladium and rhodium; and boehmite alumina serving as a base material. In this exhaust gas purifying catalyst, nitrogen oxides in exhaust gas from the engine is trapped to the exhaust gas purifying catalyst when exhaust gas is in a lean region and is reduced into nitrogen by the exhaust gas purifying catalyst when exhaust gas is in a stoichiometric region or a rich region.

11 Claims, 1 Drawing Sheet

EXHAUST GAS PURIFYING CATALYST

BACKGROUND OF THE INVENTION

This invention relates to improvements in an exhaust gas purifying catalyst for purifying exhaust gas discharged from a combustion device such as an engine or a boiler, and more particularly to an exhaust gas purifying catalyst for effectively removing hydrocarbons (HC), carbon monoxide (CO) and nitrogen oxides (NOx) contained in exhaust gas discharged from an automotive internal combustion engine in such a manner that NOx can be particularly effectively reduced in a lean or oxygen-excessive region of exhaust gas.

In recent years, low fuel consumption automotive vehicles have been required from the viewpoints of petroleum resource exhaustion problem and warm-up problem for the earth. In this regard, attentions have been paid on development of lean-burn automotive engines. In the lean-burn automotive engines, exhaust gas (atmosphere) becomes in a lean region in which air-fuel ratio of exhaust gas is lean as compared with a stoichiometric level, during lean-burn operation. In case that a usual thee-way catalyst is used in such a lean region of exhaust gas atmosphere, reduction of NOx can become insufficient under the effect of excessive oxygen. Consequently, it has been eagerly desired to develop exhaust gas purifying catalysts which can effectively reduce NOx even in the presence of excessive oxygen.

In view of the above, a variety of exhaust gas purifying catalysts for reducing NOx in the lean region of exhaust gas have been proposed. An example of these exhaust gas purifying catalysts is disclosed in Japanese Patent Provisional Publication No. 5-168860, in which platinum and lanthanum are carried on a porous substrate so that NOx is trapped in the lean region of exhaust gas and released when the concentration of oxygen is decreased.

SUMMARY OF THE INVENTION

However, drawbacks have been encountered in conventional exhaust gas purifying catalysts including one disclosed in Japanese Patent Provisional Publication No. 5-168860, in which they are insufficient in performance and cannot be sufficiently activated when the temperature of exhaust gas is relatively low (for example, within a low range of from 100 to 250° C.). Additionally, sulfur is contained in fuel and lubricating oil, and therefore this sulfur is discharged in the form of oxide into exhaust gas. This sulfur poisons a NOx adsorbing or trapping material in the conventional exhaust gas purifying catalyst, thereby lowering the NOx adsorbing ability of the NOx adsorbing material.

It is an object of the present invention to provide an improved exhaust gas purifying catalyst which can effectively overcome drawbacks encountered in conventional exhaust gas purifying catalysts.

Another object of the present invention is to provide an improved exhaust gas purifying catalyst which can effectively adsorb or trap NOx in exhaust gas while can be readily released from S-poisoning.

A further object of the present invention is to provide an improved exhaust gas purifying catalyst which exhibits a high activity at low temperatures such as 150 to 500° C.

An aspect of the present invention resides in an exhaust gas purifying catalyst comprising at least one noble metal selected from the group consisting of platinum, palladium and rhodium; and boehmite alumina. In this exhaust gas purifying catalyst, nitrogen oxides in exhaust gas from a combustion device is trapped to the exhaust gas purifying catalyst when exhaust gas is in a lean region and is reduced into nitrogen by the exhaust gas purifying catalyst when exhaust gas is in a range including a stoichiometric region and a rich region.

Another aspect of the present invention resides in a process for purifying exhaust gas, comprising: (a) preparing an exhaust gas purifying catalyst including least one noble metal selected from the group consisting of platinum, palladium and rhodium, and boehmite alumina; and (b) flowing exhaust gas from a combustion device through the exhaust gas purifying catalyst so that nitrogen oxides in exhaust gas from the combustion device is trapped to the exhaust gas purifying catalyst when exhaust gas is in a lean region and is reduced into nitrogen by the exhaust gas purifying catalyst when exhaust gas is in a range including a stoichiometric region and a rich region.

DETAILED DESCRIPTION OF THE INVENTION

Figure 1:
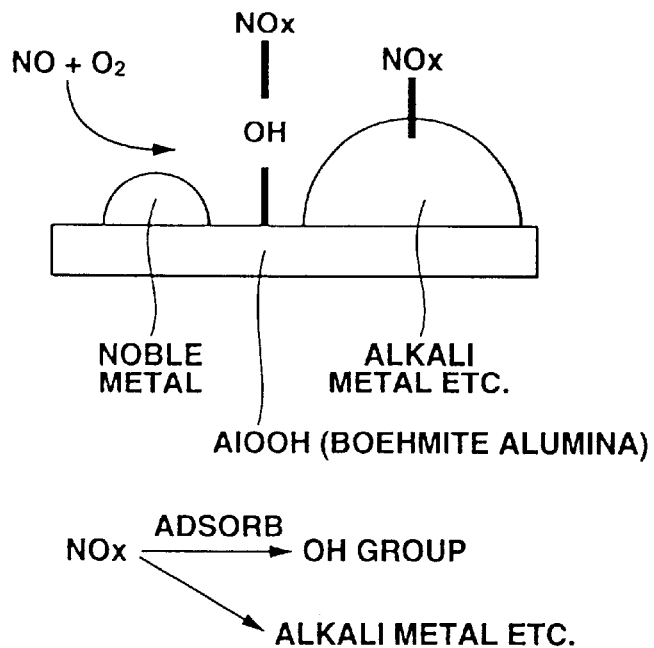
FIG. 1 is a schematic illustration showing an idea of a mechanism in which NOx is trapped to an exhaust gas purifying catalyst according to the present invention.

According to the present invention, an exhaust gas purifying catalyst comprises at least one noble metal selected from the group consisting of platinum, palladium and rhodium; and boehmite alumina serving as a base material. In this exhaust gas purifying catalyst, nitrogen oxides in exhaust gas from a combustion device is trapped to the exhaust gas purifying catalyst when exhaust gas is in a lean region and is reduced into nitrogen by the exhaust gas purifying catalyst when exhaust gas is in a range including a stoichiometric region and a rich region.

The present invention has been established on the following inventors' finding: In general, OH groups (so-called surface hydroxyl groups) exist at the surface section of alumina. In the lean region or atmosphere of exhaust gas, under a mutual action made between these OH groups and NOx oxidized in the presence of the noble metals such as Pt, Pd, Rh and/or the like, NOx ($NO_2$) can be trapped or retained to alumina. More specifically, NOx is retained to OH groups. Additionally, $NO_2$ retained to OH groups is converted into nitrogen ($N_2$) as the concentration of reducing gas such as HC, CO and the like in exhaust gas decreases. The above NOx oxidized in the presence of the noble metals has been identified as $NO_2$ as a result of an infrared spectroscopic analysis.

The combustion device is preferably an automotive internal combustion engine. In the lean region, exhaust gas discharged from the engine has an air-fuel ratio leaner (in fuel) than a stoichiometric value, in which the engine is supplied with air-fuel mixture having an air-fuel ratio leaner than the stoichiometric value. In the stoichiometric region, exhaust gas has a generally stoichiometric air-fuel ratio, in which the engine is supplied with air-fuel mixture having a generally stoichiometric air-fuel ratio. In the rich region, exhaust gas has an air-fuel ratio richer (in fuel) than the stoichiometric valve, in which the engine is supplied with air-fuel mixture having an air-fuel ratio richer than the stoichiometric value. It will be understood that, in the lean region or atmosphere, the concentration of oxidizing gas such as NOx is high relative to that of reducing gas such as HC and CO. It will be understood that the combustion device may be a furnace, a burner or a boiler.

According to the above finding in which NOx can be retained to OH groups of the base material such as alumina, it will be appreciated that the base material of the exhaust gas purifying catalyst of the present invention preferably has a large number (amount) of surface OH groups at the surface section thereof. A familiar example of such base material is boehmite alumina represented by a chemical formula AlOOH. In a conventional technique, activated alumina has been used as a base material (on which catalyst metal components are carried) of an exhaust gas purifying catalyst. The activated alumina has OH groups to some extent, whereas boehmite alumina has a large number (amount) of OH groups. It is preferable that boehmite alumina is used as the base material in the exhaust gas purifying catalyst of the present invention; however, the base material is not particularly limited to boehmite alumina so that the base material may be materials (having a relatively large number of surface OH groups) other than boehmite alumina.

The amount or extent of presence of OH groups in the base material can be specified or measured, for example, by a XRD (X-ray diffraction) method and a NMR (nuclear magnetic resonance) analysis. The XRD method can specify presence of aluminum compound containing OH groups. The NMR analysis can provide the proportions of presence of OH groups.

Boehmite alumina is used or contained preferably in an amount ranging from 20 to 400 g, more preferably in an amount ranging from 50 to 400 g per one liter of the exhaust gas purifying catalyst or per one liter of a monolithic substrate in case that boehmite alumina is carried on the monolithic substrate. If the amount or content of boehmite alumina is less than 20 g per one liter of the catalyst, the number (amount) of OH groups is insufficient so as not to obtain a sufficient effect of bonding NOx to OH groups at the surface section of boehmite alumina. Even if the amount or content of boehmite alumina exceeds 400 g per one liter of the catalyst, an advantageous effect corresponding to an increased amount of boehmite alumina cannot be obtained.

The noble metals such as Pt, Pd and Rh not only serve as catalyst metal components for reducing NOx but also serve as catalyst metal components for oxidizing HC and CO, thereby totally purifying exhaust gas discharged from the engine.

The exhaust gas purifying catalyst of the present invention preferably has a high heat resistance taking account of the fact that the catalyst undergoes high temperatures. For this purpose, catalyst metal components for improving heat resistance of noble metals and alumina may be contained in the exhaust gas purifying catalyst, in which ceria, zirconia, lanthanum, barium and/or the like are carried on boehmite alumina. Such ceria and/or the like have been conventionally used for the same purpose in three-way catalysts.

Preferably, the noble metals such as Pt, Pd and/or Rh are directly carried on boehmite alumina. By this, the noble metal(s) and surface OH groups at the surface section of the base material approach each other so that the mutual action between NOx on the noble metal(s) and surface OH groups tends to easily occur, thereby increasing the effect of bonding NOx reduced by the noble metal(s) to surface OH groups at the surface section.

Additionally, it is preferable that the exhaust gas purifying catalyst contains compound of alkali metal, compound of alkaline earth metal and/or compound of rare earth metal as a catalyst metal component(s), thereby further improving its absorbing ability for $NO_2$ thus to improve its NOx reducing efficiency. It is assumed that electron donating is made from the above catalyst metal component(s) to surface OH groups at the surface section of boehmite alumina thereby promoting the mutual action between NOx and OH groups at the surface section. Preferable example of alkali metal, alkaline earth metal and rare earth metal from the viewpoints of resource amount and handling readiness are lithium (Li), sodium (Na), potassium (K), rubidium (Rb), cesium (Cs), strontium (Sr), barium (Ba), and/or lanthanum (La), in which any combination of the above metals may be used.

Figure 2:
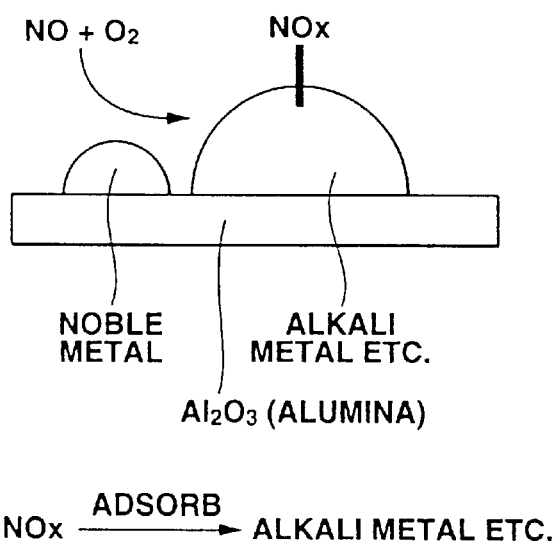
FIG. 2 is a schematic illustration showing an idea of a mechanism in which NOx is trapped to a conventional exhaust gas purifying catalyst.

FIG. 1 schematically illustrates an idea of a mechanism in which NOx is absorbed to the base material (boehmite alumina) in the exhaust gas purifying catalyst according to the present invention. As apparent from FIG. 1, according to the present invention, NOx is reduced by the noble metal (catalyst metal component) and then not only absorbed to the alkali metal and/or the like but also absorbed or combined to OH groups of the boehmite alumina. As a result, the exhaust gas purifying catalyst of the present invention can absorb more NOx than a conventional similar exhaust gas purifying catalyst as schematically illustrated in FIG. 2. In the conventional exhaust gas purifying catalyst shown in FIG. 2, NOx is reduced by the noble metal (catalyst metal component) and then absorbed to alkali metal and/or the like. Thus, the exhaust gas purifying catalyst of the present invention can effectively adsorb much NOx as compared with conventional similar exhaust gas purifying catalysts.

Additionally, the exhaust gas purifying catalyst of the present invention is featured by a S-poisoning releasing or canceling characteristics by which the catalyst can be readily released from poisoning with sulfur. This is because, in the exhaust gas purifying catalyst of the present invention, S tends to be readily released from OH groups of boehmite alumina even when OH groups of the boehmite alumina is poisoned with S.

Further, the exhaust gas purifying catalyst of the present invention is featured by being high in low temperature activity. This is because absorption reaction of NOx to OH groups of boehmite alumina can occur relatively low temperatures.

It is preferable that the exhaust gas purifying catalyst is used by coating catalyst components (the base material and the noble metal(s)) of the present invention on a variety of shapes of substrates. Preferable examples of the substrates are monolithic substrates formed of heat-resistant material, such as a cordierite ceramic honeycomb-type substrate and a stainless steel honeycomb-type substrate. In order to coat the monolithic substrate with the base material and the noble metal(s) of the present invention, for example, powder material containing boehmite alumina is pulverized in wet process or in the presence of liquid to form a slurry; and then the slurry is coated on the monolithic substrate to form a catalytic coat layer on the surface of the monolithic substrate. The noble metal(s) are also carried on the monolithic substrate by previously carrying the noble metal(s) on powder of boehmite alumina or other powders, followed by mixing; or by impregnating the monolithic substrate with a solution containing the noble metal(s) after the catalyst components other than the noble metal(s) is carried on the monolithic substrate. Thus, the exhaust gas purifying catalyst of the present invention is produced.

The exhaust gas purifying catalyst is disposed in an exhaust gas passageway of the internal combustion engine, in which NOx can be effectively reduced or removed by controlling the composition of exhaust gas in such a manner that exhaust gas is alternately put into the lean region and the stoichiometric region, or into the lean region and the rich region. It will be understood that NOx is absorbed and retained or trapped in the catalyst components when exhaust gas is in the lean region, and the retained NOx is converted into $N_2$ when exhaust gas is in the stoichiometric or rich region.

It is to be noted that the exhaust gas purifying catalyst of the present invention can adsorb and retain NOx and convert the retained NOx into $N_2$ at very low temperatures such as 150° C. Accordingly, reduction and removal of NOx becomes possible even if the temperature at a position immediately upstream of the exhaust gas purifying catalyst is within a range of from 150 to 500° C. when exhaust gas is in the lean region. It is assumed that, with the exhaust gas purifying catalyst of the present invention, mutual action between $NO_2$ and OH groups occurs at temperatures lower than those at which mutual action between NOx and alkali metal or alkaline earth metal occurs in the conventional catalyst as shown in FIG. 2. Additionally, it is to be noted that NOx can be further effectively reduced or removed by the exhaust gas purifying catalyst of the present invention in case that air-fuel (air/fuel) ratio of air-fuel mixture to be supplied to the engine is within a range of from 20 to 50, and within a range of from 10.0 to 14.6.

EXAMPLES

The present invention will be more readily understood with reference to the following Examples in comparison with Comparative Examples; however, these Examples are intended to illustrate the invention and are not to be construed to limit the scope of the invention.

Example 1

First, boehmite alumina powder was impregnated with an aqueous solution of dinitrodiammine platinum, and dried and then fired in air at 400° C. for 1 hour thereby obtaining Pt-carried boehmite alumina powder (Powder A) whose Pt concentration was 5.0% by weight.

Additionally, boehmite alumina powder was impregnated with an aqueous solution of Rh nitrate, and dried and then fired in air at 400° C. for 1 hour thereby obtaining Rh-carried boehmite alumina powder (Powder B) whose Rh concentration was 2.0% by weight.

Subsequently, a porcelain ball mill was charged with 320 g of Powder A, 158 g of Powder B, 423 g of activated alumina powder and 900 g of water, followed by mixing and pulverizing, thereby obtaining a slurry. This slurry was coated on a cordierite ceramic honeycomb-type monolithic substrate having a volume of 1.7 liters and 400 (axially extending) cells per square inch, so that thin walls of cells were coated with the slurry. Thereafter, the coated monolithic substrate was blown with air stream to remove excessive slurry in the cells, and dried at 130° C. and then fired at 400° C. for 1 hour, thereby forming a catalyst having a catalytic coat layer formed on the wall of the cells of the monolithic substrate. The weight of the catalytic coat layer was 200 g per one liter of the monolithic substrate, in which 100 g of boehmite alumina was carried per one liter of the monolithic substrate.

The thus formed catalyst was impregnated with an aqueous solution of Ba acetate, and dried and then fired in air at 400° C. for 1 hour. As a result, an exhaust gas purifying catalyst of Example 1 was prepared forming a catalytic coat layer formed on the monolithic substrate, the total weight of the catalytic coat layers being 250 g per one liter of the monolithic substrate.

Comparative Example 1

A procedure in Example 1 was repeated with the exception that boehmite alumina powder in Powder A and Powder B was replaced with activated alumina, thereby preparing an exhaust gas purifying catalyst of Comparative Example 1.

Example 2

A procedure in Example 1 was repeated with the exception that a part of boehmite alumina in Powder A was replaced with activated alumina so that 20 g of boehmite alumina was carried per one liter of the monolithic substrate, thereby preparing an exhaust gas purifying catalyst of Example 2.

Example 3

A procedure in Example 1 was repeated with the exception that a part of boehmite alumina in Powder A is replaced with activated alumina so that 50 g of boehmite alumina was carried per one liter of the monolithic substrate, thereby preparing an exhaust gas purifying catalyst of Example 3.

Example 4

First, boehmite alumina powder was impregnated with an aqueous solution of palladium nitrate, and dried and then fired in air at 400° C. for 1 hour thereby obtaining Pd-carried boehmite alumina powder (Powder C) whose Pd concentration was 5.0% by weight.

Subsequently, a porcelain ball mill was charged with 160 g of Powder A, 158 g of Powder B, 160 g of Powder C, 423 g of activated alumina powder and 900 g of water, followed by mixing and pulverizing, thereby obtaining a slurry. This slurry was coated on a cordierite ceramic honeycomb-type monolithic substrate having a volume of 1.7 liters and 400 (axially extending) cells per square inch, so that thin walls of cells were coated with the slurry. Thereafter, the coated monolithic substrate was blown with air stream to remove excessive slurry in the cells, and dried at 130° C. and then fired at 400° C. for 1 hour. As a result, an exhaust gas purifying catalyst of Example 4 was prepared in which a catalytic coat layer is formed on the wall of the cells of the monolithic substrate. The weight of the catalytic coat layer was 200 g per one liter of the monolithic substrate.

Example 5

A procedure in Example 1 was repeated with the exception that the aqueous solution of Ba acetate was replaced with an aqueous solution of Na carbonate, thereby preparing an exhaust gas purifying catalyst of Example 5.

Example 6

A procedure in Example 1 was repeated with the exception that the aqueous solution of Ba acetate was replaced with an aqueous solution of Cs carbonate, thereby preparing an exhaust gas purifying catalyst of Example 6.

Evaluation of Performance of Exhaust Gas Purifying Catalyst

Evaluation test (for emission performance) was conducted on the exhaust gas purifying catalysts of Examples and Comparative Examples, by incorporating each exhaust gas purifying catalyst in an exhaust system of an automotive internal combustion engine having a displacement of 2000 cc.

In the emission performance evaluation test, the engine was operated by controlling air-fuel ratio of air-fuel mixture to be supplied to the engine, in a manner to repeat a cycle consisting of a first section (30 sec.) where the air-fuel (Air/Fuel) ratio is lean (20), a second section (4 sec.) where the air-fuel ratio is rich (11.0) and a third section (5 sec.) where the air-fuel ratio is stoichiometric (14.7). During this test, a concentration A of gas components (HC, CO and NOx) in exhaust gas from the engine in a state where no exhaust gas purifying catalyst was provided was measured, and a concentration B in exhaust gas emitted through the exhaust gas purifying catalyst was measured, thereby obtaining an exhaust gas purifying efficiency ("conversion rate (%)" of the gas components), as shown in Table 1. The convention rates of each exhaust gas purifying catalyst was determined under a first condition where the temperature of exhaust gas at a position immediately upstream of the catalyst was 200° C. and a second condition where the same temperature of exhaust gas was 350° C. The conversion rate (%) was calculated by a formula [(the concentration A of a gas component–the concentration B of the gas component I the concentration A of the gas component)×100], in which the concentrations were measured as "ppm".

Prior to the evaluation test, the exhaust gas purifying catalysts of Examples and Comparative Examples underwent a durability test in which each catalyst was incorporated in an exhaust system of an automotive internal combustion engine having a displacement of 4400 cc. The engine was operated for 50 hours using a regular gasoline (in Japan) as fuel, in which the temperature of exhaust gas at a position immediately upstream of the catalyst was kept at 650° C. The regular gasoline had a trade name "Nisseki Dasshu Gasoline" and had been produced by Nippon Oil Co., Ltd., and had a S content of not more than 30 ppm. Thereafter, each exhaust gas purifying catalyst was subjected to a S-poisoning treatment in which the engine provided with the exhaust gas purifying catalyst was operated for 5 hours using a gasoline having a S concentration of 300 ppm as fuel, in which the temperature of exhaust gas at the position immediately upstream of the catalyst was kept at 350° C. Subsequently, each exhaust gas purifying catalyst was subjected to a S-releasing treatment for releasing S from the catalyst, by operating the engine provided with the exhaust gas purifying catalyst for 30 minutes using a Japanese regular gasoline as fuel, in which the temperature of exhaust gas at the position immediately upstream of the catalyst was kept at 650° C.

TABLE 1

| Sample | Conversion rate at 200° C. | | | Conversion rate at 350° C. | | |
|---|---|---|---|---|---|---|
| | CO | HC | NOx | CO | HC | NOx |
| Example 1 | 99 | 90 | 89 | 99 | 95 | 92 |
| Comp. Example 1 | 98 | 90 | 78 | 98 | 95 | 85 |
| Example 2 | 98 | 91 | 80 | 98 | 97 | 88 |
| Example 3 | 99 | 90 | 85 | 99 | 95 | 90 |
| Example 4 | 98 | 92 | 85 | 98 | 97 | 90 |
| Example 5 | 99 | 85 | 90 | 99 | 93 | 94 |
| Example 6 | 97 | 80 | 95 | 97 | 90 | 94 |

The above evaluation test reveals that since the exhaust gas purifying catalysts of the present invention contains the base material having much hydroxyl groups at the surface section thereof, NOx in exhaust gas can be effectively adsorbed or trapped while S-poisoning is not liable to occur.

The entire contents of Japanese Patent Application P2000-123905 (filed Apr. 25, 2000)) are incorporated herein by reference.

Although the invention has been described above by reference to certain embodiments or examples of the invention, the invention is not limited to the embodiments or examples described above. Modifications and variations of the embodiments or examples described above will occur to those skilled in the art, in light of the above teachings. The scope of the invention is defined with reference to the following claims.

What is claimed is:

1. An exhaust gas purifying catalyst comprising:

at least one noble metal selected from the group consisting of platinum, palladium and rhodium, and boehmite alumina in an amount ranging from 20 to 400 g per one liter of said exhaust gas purifying catalyst;

wherein nitrogen oxides in exhaust gas from a combustion device are trapped by said exhaust gas purifying catalyst when exhaust gas is in a lean region and are reduced into nitrogen by said exhaust gas purifying catalyst when exhaust gas is in a range including a stoichimetric region and a rich region.

2. An exhaust gas purifying catalyst as claimed in claim 1, wherein said at least one noble metal is carried on said boehmite alumina.

3. An exhaust gas purifying catalyst as claimed in claim 2, further comprising at least one metal selected from the group consisting of alkali metal, alkaline earth metal, and rare earth metal.

4. An exhaust gas purifying catalyst as claimed in claim 1, further comprising at least one metal selected from the group consisting of alkali metal, alkaline earth metal, and rare earth metal.

5. A process for forming the exhaust gas purifying catalyst claimed in claim 1, comprising:

impregnating boehmite alumina powder with the at least one noble metal;

forming a slurry of the impregnated boehmite alumina powder;

coating the slurry on a substrate; and firing the slurry coated substrate.

6. An exhaust gas purifying catalyst as claimed in claim 1, wherein the boehmite alumina is in an amount ranging from 50 to 400 g per one liter of said exhaust gas purifying catalyst.

7. An exhaust gas purifying catalyst as claimed in claim 6, wherein the boehmite alumina is in an amount of 100 g per one liter of said exhaust gas purifying catalyst.

8. An exhaust gas purifying catalyst as claimed in 6, wherein the boehmite alumina is in an amount of 20 g per one liter of said exhaust gas purifying catalyst.

9. A process for purifying exhaust gas, comprising:

preparing an exhaust gas purifying catalyst including at least one noble metal selected from the group consisting of platinum, palladium and rhodium, and boehmite alumina in an amount ranging from 20 to 400 g per one liter of said exhaust gas purifying catalyst; and flowing exhaust gas from a combustion device through the exhaust gas purifying catalyst so that nitrogen oxides in exhaust gas from the combustion device are trapped by the exhaust gas purifying catalyst when exhaust gas is in a lean region and are reduced into nitrogen by the exhaust gas purifying catalyst when exhaust gas is in a range including a stoichimetric region and a rich region.

10. The process for purifying exhaust gas as claimed in claim 9, wherein the boehmite alumina is in an amount ranging from 50 to 400 g per one liter of said exhaust gas purifying catalyst.

11. The process for purifying exhaust gas as claimed in claim 9, wherein the catalyst further comprises at least one metal selected from the group consisting of alkali metal, alkaline earth metal, and rare earth metal.

* * * * *